(12) United States Patent
Wirkowski et al.

(10) Patent No.: US 9,447,893 B2
(45) Date of Patent: Sep. 20, 2016

(54) METHOD AND DEVICE FOR CONTROLLING A VALVE

(75) Inventors: Michael Wirkowski, Regensburg (DE); Christian Mey, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 505 days.

(21) Appl. No.: 14/115,438

(22) PCT Filed: May 3, 2012

(86) PCT No.: PCT/EP2012/058122
§ 371 (c)(1),
(2), (4) Date: Feb. 11, 2014

(87) PCT Pub. No.: WO2012/150298
PCT Pub. Date: Nov. 8, 2012

(65) Prior Publication Data
US 2014/0216419 A1    Aug. 7, 2014

(30) Foreign Application Priority Data
May 4, 2011    (DE) .......................... 10 2011 075 271

(51) Int. Cl.
*F02M 51/00*    (2006.01)
*F16K 15/18*    (2006.01)
(Continued)

(52) U.S. Cl.
CPC .............. *F16K 15/18* (2013.01); *F02D 41/20* (2013.01); *F02M 59/36* (2013.01); *F02M 59/368* (2013.01);
(Continued)

(58) Field of Classification Search
CPC ........... F02D 41/3809; F02D 41/3082; F02D 2041/2003; F02M 55/025; F02M 37/0029
USPC .......................... 123/445, 456.479, 480, 490
See application file for complete search history.

(56) References Cited

U.S. PATENT DOCUMENTS

| 5,986,871 A | 11/1999 | Forck et al. .................. 361/160 |
| 6,067,955 A | 5/2000 | Boecking ...................... 123/299 |

(Continued)

FOREIGN PATENT DOCUMENTS

| CN | 1241244 A | 1/2000 | ............. F02M 45/04 |
| DE | 4110254 A1 | 10/1992 | ................ B60T 8/36 |

(Continued)

OTHER PUBLICATIONS

Chinese Office Action, Application No. 201280021826.5, 11 pages, Jun. 3, 2015.

(Continued)

*Primary Examiner* — John Kwon
(74) *Attorney, Agent, or Firm* — Slayden Grubert Beard PLLC

(57) ABSTRACT

A method is disclosed for controlling a valve having a spring with a spring force, an actuator with an actuator force opposing the spring force, and a pin that is actuated by the actuator, a seal element that can be coupled with the pin, and a seal seat, the valve being closed when the seal element sits against the seal seat. The method includes determining an expected natural opening time when the seal element is lifted off the seal seat based on a pressure difference in front and behind the valve, impressing a specified current on the actuator at a point in time within a specified interval prior to the natural opening time, the seal element sitting against the seal seat at the point in time such that the pin contacts the seal element and the actuator force matches the spring force, which is reduced by a specified value.

20 Claims, 3 Drawing Sheets

(51) Int. Cl.
*F02D 41/20* (2006.01)
*F02M 59/46* (2006.01)
*F04B 7/00* (2006.01)
*F02M 59/36* (2006.01)
*F02D 41/38* (2006.01)

(52) U.S. Cl.
CPC ......... *F02M 59/464* (2013.01); *F02M 59/466* (2013.01); *F04B 7/0076* (2013.01); *F02D 41/3845* (2013.01); *F02M 2200/09* (2013.01)

(56) References Cited

U.S. PATENT DOCUMENTS

| | | | |
|---|---|---|---|
| 2004/0181760 A1* | 9/2004 | Ismailov | F02D 41/20 703/2 |
| 2005/0279867 A1* | 12/2005 | Ismailov | F02D 41/20 239/585.1 |
| 2008/0059039 A1* | 3/2008 | Nakagawa | F02D 41/2464 701/99 |
| 2010/0250096 A1* | 9/2010 | Yamada | F02D 41/3809 701/103 |
| 2010/0250102 A1* | 9/2010 | Imai | F02D 41/3863 701/105 |
| 2011/0295493 A1 | 12/2011 | Wilms et al. | 701/103 |
| 2011/0315124 A1 | 12/2011 | Richter et al. | 123/480 |

FOREIGN PATENT DOCUMENTS

| | | | |
|---|---|---|---|
| DE | 19848970 A1 | 5/1999 | F02D 41/20 |
| DE | 10148219 A1 | 4/2003 | F02D 41/20 |
| DE | 102008054513 A1 | 6/2010 | F02D 41/38 |
| DE | 102008054702 A1 | 6/2010 | H01F 7/18 |
| EP | 0563760 A2 | 10/1993 | F02D 41/00 |
| EP | 1674717 A1 | 6/2006 | F02D 41/38 |
| EP | 1701031 A1 | 9/2006 | F02M 59/36 |
| WO | 2012/150298 A1 | 11/2012 | F02D 41/20 |

OTHER PUBLICATIONS

International Search Report and Written Opinion, Application No. PCT/EP2012/058122, 15 pages, Jul. 5, 2012.

* cited by examiner

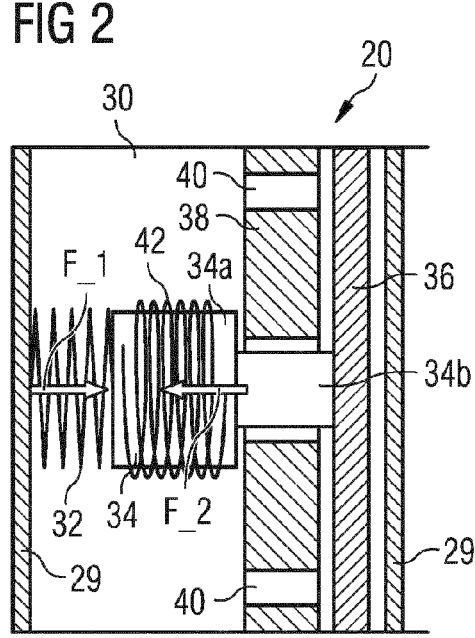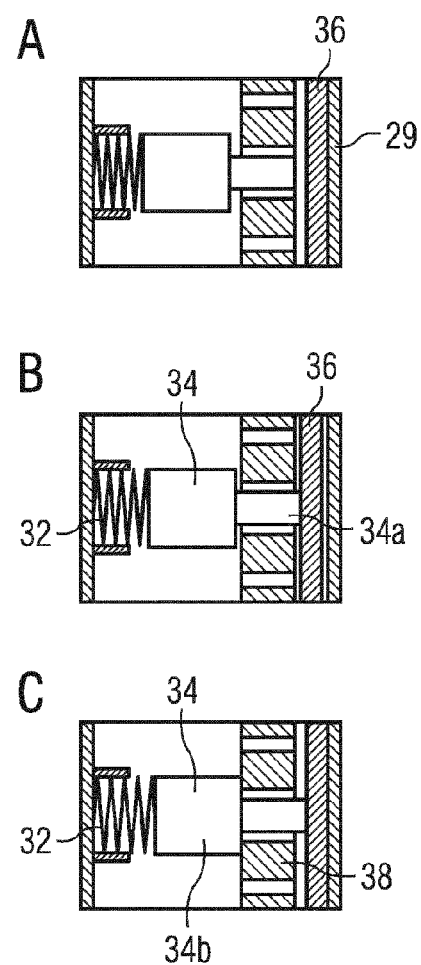

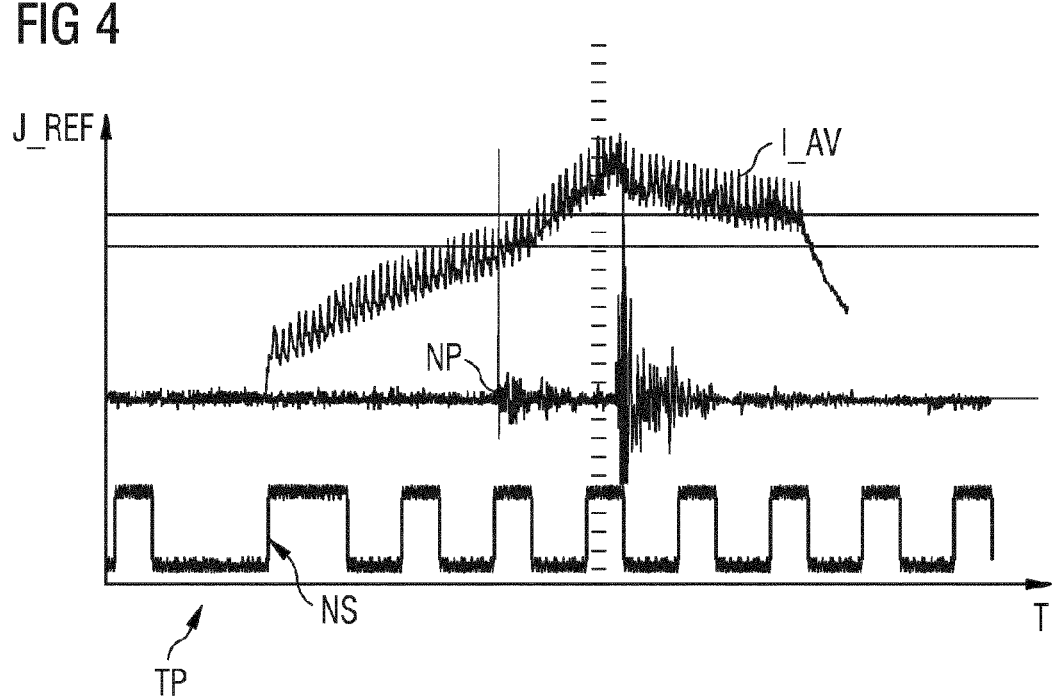

METHOD AND DEVICE FOR CONTROLLING A VALVE

CROSS-REFERENCE TO RELATED APPLICATIONS

This application is a U.S. National Stage application of International Application No. PCT/EP2012/058122 filed May 3, 2012, which designates the United States of America, and claims priority to DE Application No. 10 2011 075 271.4 filed May 4, 2011, the contents of which are hereby incorporated by reference in their entirety.

TECHNICAL FIELD

The invention relates to a method and a device for controlling a valve, e.g., a valve used in a high-pressure pump in an accumulator-type injection system of an internal combustion engine.

BACKGROUND

Certain internal combustion engines include an accumulator-type injection system having a high-pressure pump for delivering fluid. Such valves are subjected to intense stresses, in particular if they are subjected to continuous loading such as is the case for example in high-pressure pumps. Since high-pressure pumps are subjected to pressures of for example 2000 bar and greater, high demands are placed on the valves in pumps of said type. Noises can occur both during the closing and during the opening of said valves.

SUMMARY

One embodiment provides a method for controlling a valve which has a spring with a spring force, an actuator with an actuator force that can counteract the spring force, a pin that can be actuated by means of the actuator, a sealing element that can be coupled to the pin, and a sealing seat, such that the valve is closed when the sealing element bears against the sealing seat, comprising: determining an expected natural opening time at which the sealing element lifts from the sealing seat owing to a pressure difference upstream and downstream of the valve, and applying an electrical current with a predefined value to the actuator at a time, within a predefined interval before the natural opening time, at which the sealing element bears against the sealing seat, such that the pin makes contact with the sealing element and the actuator force corresponds to the spring force reduced by a predefined value.

In a further embodiment, in a first operating mode, the actuator has the current applied to it with a predefined non-constant profile proceeding from a starting value of the current, at which the pin is in a position in which it permits the closure of the valve, measurement values of the current are determined temporally in succession, a reference value of the current assumes the present measurement value of the current when the profile of the measurement values of the current deviates by a predefined magnitude from the profile of the current applied to the actuator, wherein the reference value of the current is representative of the actuator force corresponding to the spring force reduced by a predefined value, and wherein in a second operating mode, the predefined value of the current that is applied to the actuator at the time within the interval before the natural opening time corresponds to the reference value.

In a further embodiment, the spring is designed for opening the valve, and wherein in the first operating mode, the applied current decreases linearly proceeding from the starting value of the current, and at the starting value of the current, the actuator force is greater than the spring force.

In a further embodiment, the applied current is set as a function of a pulse width modulation.

In a further embodiment, the measurement values of the current are determined as a function of a voltage across a shunt resistor.

In a further embodiment, the reference value of the current is determined as a function of a temperature of a fluid in the valve or in a predefined region of the valve.

In a further embodiment, the valve is arranged in an injection system of an internal combustion engine, and the reference value of the current is determined as a function of characteristic values of the internal combustion engine.

In a further embodiment, the reference value of the current is stored in an operating-point-dependent characteristic map.

In a further embodiment, in the second operating mode, measurement values of the current are determined as a function of a voltage across a shunt resistor.

In a further embodiment, the natural opening time is determined as a function of a temperature of a fluid in the valve or in a predefined region of the valve and/or as a function of the pressure within the valve.

In a further embodiment, the valve is arranged in an injection system of an internal combustion engine, and the natural opening time is determined as a function of characteristic values of the internal combustion engine.

In a further embodiment, the natural opening time is stored in an operating-point-dependent characteristic map.

In a further embodiment, in the second operating mode, after the natural opening time, an electrical current is applied to the actuator such that the pin moves into a position in which it does not permit the closure of the valve.

Another embodiment provides a device for controlling a valve which has a spring with a spring force, an actuator with an actuator force that can counteract the spring force, a pin that can be actuated by means of the actuator, a sealing element that can be coupled to the pin, and a sealing seat, such that the valve is closed when the sealing element bears against the sealing seat, wherein the device is designed for: determining an expected natural opening time at which the sealing element lifts from the sealing seat owing to a pressure difference upstream and downstream of the valve, and applying an electrical current with a predefined value to the actuator at a time, within a predefined interval before the natural opening time, at which the sealing element bears against the sealing seat, such that the pin makes contact with the sealing element and the actuator force corresponds to the spring force reduced by a predefined value.

BRIEF DESCRIPTION OF THE DRAWINGS

Example embodiments of the invention are explained below with reference to the drawings, in which:

FIG. 2 shows a schematic view of the valve in a longitudinal section,

FIG. 3 shows a schematic view of the valve in three operating states, and

FIG. 4 shows a schematic view of current profiles during the control of the valve.

DETAILED DESCRIPTION

Figure 1:
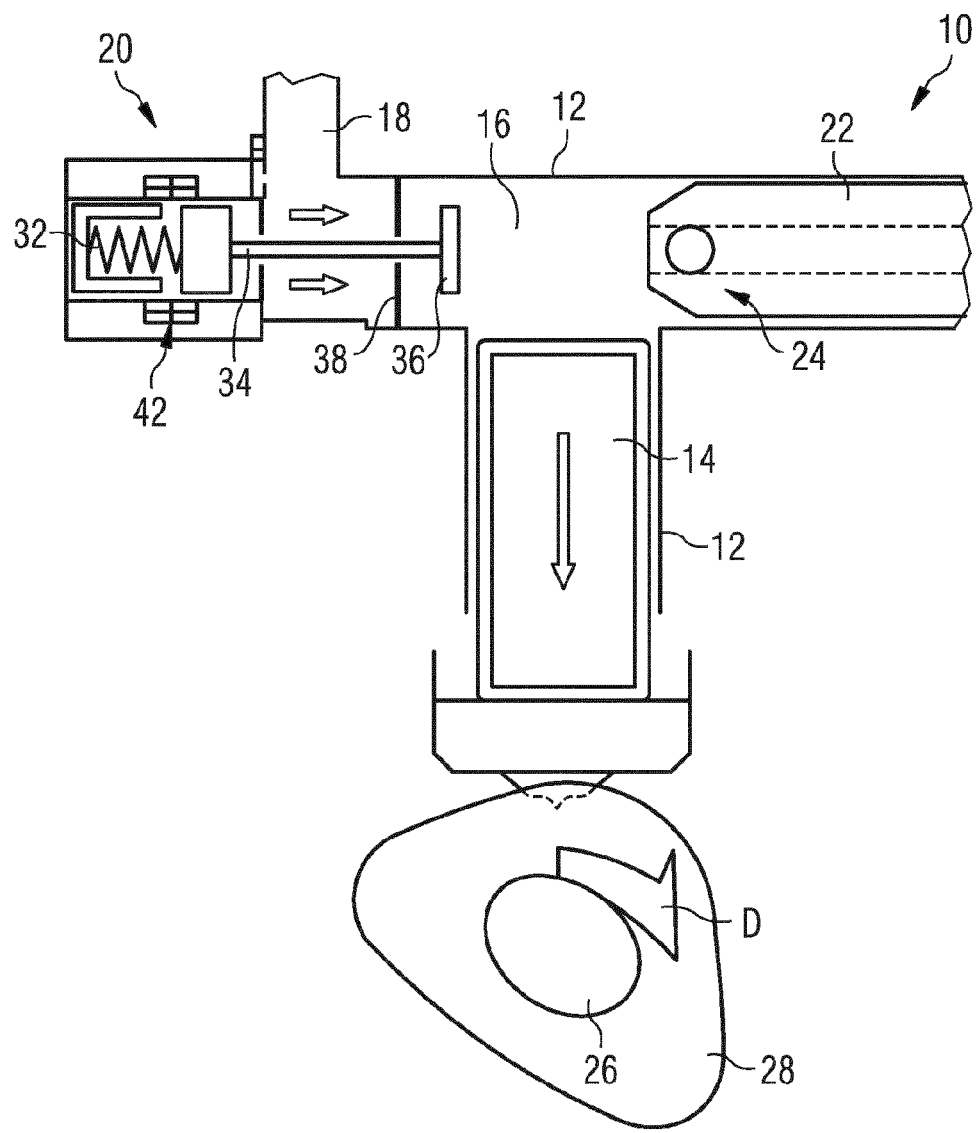
FIG. 1 shows a schematic view of a pump with a valve in a longitudinal section.

Embodiment of the present invention provide a method and a device for controlling a valve, which method and device permit precise and quiet operation of the valve.

In one embodiment, the valve has a spring with a spring force. The valve furthermore has an actuator with an actuator force that can counteract the spring force. The valve has a pin that can be actuated by means of the actuator. The valve also has a sealing element that can be coupled to the pin. The valve has a sealing seat, such that the valve is closed when the sealing element bears against the sealing seat.

An expected natural opening time, at which the sealing element lifts from the sealing seat owing to a pressure difference upstream and downstream of the valve, is determined. An electrical current with a predefined value is applied to the actuator at a time within a predefined interval before the natural opening time. At said time, the sealing element bears against the sealing seat. The electrical current is applied such that the pin makes contact with the sealing element and the actuator force corresponds to the spring force reduced by a predefined value.

This has the advantage that the valve can be opened slowly such that the noise generated by the valve can be kept low, and reliable and sufficiently fast opening of the valve can nevertheless be achieved. Furthermore, wear of the valve can be kept low.

The value by which the spring force is reduced is in particular dependent on the pressure, or the force on the sealing element resulting from the pressure, at the natural opening time.

The interval in which the predefined current value is applied to the actuator is predefined as being very short, such that the time at which the predefined current value is applied to the actuator immediately precedes the natural opening time. At the time at which the predefined current value is applied to the actuator, the sealing element is still just bearing against the sealing seat, and in the subsequent step, at the natural opening time, the sealing element lifts from the sealing seat.

In further embodiments, in a first operating mode, the actuator has a current applied to it with a predefined non-constant profile proceeding from a starting value of the current, at which the pin is in a position in which it permits the closure of the valve. Measurement values of the current are determined temporally in succession, and a reference value of the current assumes the present measurement value of the current when the profile of the measurement values of the current deviates by a predefined magnitude from the profile of the current applied to the actuator. The reference value of the current is representative of the actuator force corresponding to the spring force reduced by the predefined value. In a second operating mode, the predefined value of the current that is applied to the actuator at the time within the predefined interval before the natural opening time corresponds to the reference value. Thus, the value of the current that is applied at the time before the natural opening time can be determined in the first operating mode.

In further embodiments, the reference value of the current and/or the natural opening time are/is dependent on a temperature of a fluid in the valve or in a predefined region of the valve. This has the advantage that reference values of the current and/or the natural opening time can be determined under different, in particular temperature-dependent operating conditions of the valve.

In further embodiments, the valve is arranged in an injection valve of an internal combustion engine, and the reference value of the current and/or the natural opening time are determined as a function of characteristic values of the internal combustion engine. This has the advantage that reference values of the current and/or the natural opening time can be determined under different operating conditions of the internal combustion engine.

In further embodiments, the reference value of the current and/or the natural opening time are stored in an operating-point-dependent characteristic map. This has the advantage that the reference values of the current and/or the natural opening time can be recorded, in particular during the course of the first operating mode, for different operating conditions of the valve and/or of the internal combustion engine, and can be used, during the second operating mode, for the respectively present operating state of the valve and/or of the internal combustion engine.

In particular, in the second operating mode, after the natural opening time, an electrical current is applied to the actuator such that the pin moves into a position in which it does not permit the closure of the valve.

FIG. 1 shows a pump 10 having a pump housing 12. The pump 10 is in particular in the form of a high-pressure pump, preferably a radial piston pump. A pump piston 14 is movably mounted in the pump housing 12. A pressure chamber 16 is situated in the pump housing 12 at one end of the pump piston 14. To enable the pressure chamber 16 to be filled with fluid, said pressure chamber has an inflow line 18 in which there is preferably arranged a valve 20 in the form of an inlet valve. The valve 20 in the form of an inlet valve is preferably in the form of a digitally switchable valve. The valve 20 facilitates the filling of the pressure chamber 16 and, during the filling process, prevents a return flow of the fluid out of the inflow line 18. The pressure chamber 16 also has an outflow line 22 in which there is arranged a further valve 24 in the form of an outlet valve. Fluid can thereby be discharged from the pressure chamber 16.

The pump 10 also has a drive shaft 26 which is operatively connected to an eccentric ring 28 and which can be rotated clockwise in a direction of rotation D. Instead of the eccentric ring 28, use may also be made of a camshaft. The pump 10 may alternatively also be designed as a crank-drive pump.

FIG. 2 shows the valve 20 with a valve housing 29 which has a recess 30. A spring 32, a pin 34 and a sealing element 36 are arranged in the recess 30. The spring 32, by virtue of its being supported on a wall of the recess 30, preloads the sealing element 36 via the pin 34. The pin 34 has a first cylindrical part 34a and a second cylindrical part 34b, wherein the first part 34a has a greater diameter than the second part 34b.

Also situated in the recess 30 is a sealing seat 38 which is arranged fixedly with respect to the valve housing 29 and which has passage recesses 40. Fluid can flow via the passage recesses 40 when the sealing element 36 is not bearing against the sealing seat 38.

The valve 20 also has an actuator 42 which is in particular in the form of a magnet coil. The first part 34a of the pin 34 is arranged within the actuator 42 and can be actuated by the actuator 42.

The mode of operation of the pump 10 and of the valve 20 will be described below:

By means of a rotational movement of the drive shaft 26 in a direction of rotation D, the pump piston 14 is moved by means of the eccentric ring 28 toward the drive shaft 26 until said pump piston reaches a bottom dead center. Here, the valve 20 opens owing to a spring force F_1 of the spring 32 and the pressure difference upstream and downstream of the valve 20. The sealing element 36 lifts from the sealing seat 38 (FIG. 3). Said time at which the sealing element 36 lifts from the sealing seat 38 is referred to as natural opening time NP (FIG. 4).

The pressure chamber 16 is now filled with fluid. By means of a further rotational movement of the drive shaft 26 in the direction of rotation D, the pump piston 14 is moved away from the drive shaft 26 by the eccentric ring 28, and in the process compresses the fluid situated in the pressure chamber 16. At a predefined time, the valve 20 is closed by virtue of a current being applied to the actuator 42, whereby an actuator force F_2, which counteracts the spring force F_1, can act on the pin 34. Owing to the movement of the pin 34 in the direction of the actuator force F_2 and the prevailing pressure conditions upstream and downstream of the valve 20, the sealing element 36 can abut against the sealing seat 38, and a fluid flow through the passage recesses 40 is prevented. The fluid that is compressed in the pressure chamber 16 can now, in its entirety, be discharged out of the pump 10 via the further valve 24 in the form of an outlet valve. The pump piston 14 has now reached a top dead center TP (camshaft signal NS, FIG. 4).

If the pump 10 is a high-pressure fuel pump of an injection system of an internal combustion engine, the highly pressurized fuel may pass to a fluid accumulator in the form of a high-pressure fuel accumulator, the so-called common rail.

Both during the opening and during the closing of the valve 20, mechanically and hydraulically induced noises can be generated at the valve 20. The noises generated during the opening of the valve 20 will be described below on the basis of FIG. 3. During the opening of the valve, in a first step, the sealing element 36 abuts against the valve housing 29 (FIG. 3A), whereby a first noise can be generated. After making contact with the valve housing 29, the sealing element 36 can move in the direction of the pin 34 again, while the pin 34 itself is moved toward the sealing element 36 by the spring force F_1 of the spring 32. A further noise can be generated if the sealing element 36 and the part 34a of the pin 34 impact against one another (FIG. 3B). The pin 34 is subsequently moved toward the sealing seat 38 by the spring force F_1 of the spring 32. A further noise can be generated if the part 34b of the pin 34 impacts against the sealing seat (FIG. 3C).

The control of the valve 20 will be presented in detail below for a valve which is open in a deenergized state (FIG. 4). It is self-evident that this may be applied correspondingly to a valve which is closed in a deenergized state.

The natural opening time NP of the valve 20 is predefined as a function of the top dead center TP. The natural opening time NP is, in embodiments, dependent on further influential variables, in particular the temperature and the pressure in the valve or in regions at the valve. Proceeding from top dead center TP, the valve is closed until the natural opening time NP. That is to say, the sealing element 36 lies against and is in contact with the sealing seat 38.

The current that is applied to the actuator is set, for example increased proceeding from the time of top dead center, such that, at a time within a predefined time interval before the natural opening time, the force F_2 has built up to such an extent that the actuator force F_2 substantially corresponds to the spring force F_1. At the time within the predefined interval, the actuator force F_2 is smaller, to a minimal extent, than the spring force F_1. The actuator force F_2 corresponds to a spring force F_1 reduced by a predefined value F_3. The predefined value F_3 is for example dependent on the pressure conditions upstream and downstream of the sealing element 36. In embodiments, at the time within the interval before the natural opening time NP, the actuator force F_2 is equal to the spring force F_1. The predefined interval before the natural opening time is selected to be infinitesimally small.

Correspondingly, the current is applied to the actuator 42 such that, immediately before the natural opening time NP, the actuator force F_2 is smaller, to a minimal extent, than the spring force F_1. As a result, at the natural opening time NP and immediately before the natural opening time NP of the valve 20, the pin 34 is in a central position between a maximum position of the pin 34 in which the pin 34, in particular the part 34b, is spaced apart from the sealing seat to a maximum extent, and a maximum position in which the pin 34, in particular the part 34b, bears against the sealing seat.

In the central position, that end of the pin 34 which faces away from the spring makes contact with the sealing element 36 but exerts no force or virtually no force on the sealing element 36. If, after the natural opening time, the sealing element 36 moves away from the sealing seat 38 in the direction of the valve housing 29 owing to the pressure conditions, the pin follows said sealing element owing to the spring force F_1. Owing to the current applied to the actuator, the impetus to which the pin is subjected owing to the spring force 34 is weakened. Furthermore, owing to the movement of the pin 34, induction is effected in the actuator 42, which changes the measurement values I_AV of the current.

Owing to the fact that the pin moves only from the central position to the end position, the distance covered by the pin is reduced. This shortens the required time until the pin arrives in the right-hand position. In this way, a low speed can be used for the movement of the pin. This reduces the impact energy (cf. FIGS. 3A to 3C). In particular, the reduced impact impetus of the pin against the end stop 38 results in quiet opening of the valve with little wear.

During operation, the gradient of the trend of the measurement values I_AV can be determined. A predefined change in the gradient is representative of the natural opening time NP. As shown in FIG. 4, the trend of the measurement values I_AV has a bend at the natural opening time NP of the valve 20. By determining the predefined change in the gradient of the trend of the measurement values I_AV, the natural opening time can be readjusted during operation, in particular during the second operating mode. A shift of the natural opening time NP may result for example from a temperature change within the valve or from a change in the pressure of the fluid in the valve.

The high-resolution illustration of the profile of the current in FIG. 4 also shows fluctuations of the current caused by a pulse width modulation. The profile of the current should however basically be regarded as linear, and the linear profile of the current merely has the relatively very small fluctuations of the pulse width modulation superposed thereon. For an opening of the valve 20, in a first operating mode, a current with a predefined profile is applied to the actuator 42. The first operating mode may also be referred to as detection mode. The value for the current that is applied to the actuator at the time before the natural opening time NP is detected in the first operating mode.

The applied current decreases proceeding from a starting value. At the starting value of the current, the actuator force F_2 is greater than the spring force F_1. The pin 34 is thus pushed in the direction of the spring 32, counter to the spring force F_1. In this state, the valve 20 can be closed. If the valve 20 is arranged in the pump 10, the applied current assumes the starting value when the pump piston 14 reaches top dead center TP.

Subsequently, measurement values I_AV of the current are determined temporally in succession. A present value of a current change with respect to time is determined as a function of two successive measurement values I_AV of the current. The current is reduced linearly until the present value of the current change with respect to time deviates from a preceding value of the current change with respect to time by a predefined magnitude, that is to say the deviation between the present value of the current change with respect to time and the preceding value of the current change with respect to time exceeds a predefined threshold value. The present value of the current change with respect to time assumes, for example, a positive value, whereas the preceding value of the current change with respect to time has a negative value. The change in the value of the current change with respect to time relative to the preceding values of the current change with respect to time is caused by an induction of an opposing current in the actuator 42 owing to a movement of the pin 34 in the direction of the spring force F_1. A reference value I_REF of the current now assumes the present measurement value I_AV of the current. The reference value I_REF of the current is representative of the actuator force F_2 being equal to the spring force F_1 reduced by the predefined value F_3.

The applied current is preferably set as a function of a pulse width modulation. In particular, it is advantageous for times for the determination of the measurement values I_AV of the current to be dependent on the times of the maxima of the pulse-width-modulated current.

The frequency of the pulse width modulation may be adapted to the desired time for the determination of the measurement values I_AV of the current. In this way, it is possible in particular for the spacing of the maxima of the pulse-width-modulated current to be adapted to the desired measurement points for the determination of the measurement values I_AV of the current.

It is particularly advantageous for the measurement values I_AV of the current to be determined by means of a voltage measurement across a shunt resistor.

The first operating mode, referred to as detection mode, may in particular be implemented as a function of ambient conditions such as the temperature of the valve 20 or a temperature of a fluid in the valve 20 or as a function of characteristic values of the internal combustion engine, for example the rotational speed or operating time of the internal combustion engine. In exemplary embodiments, the detection mode is implemented every time the internal combustion engine is started. In embodiments, the reference values I_REF of the current determined for the different operating states of the valve 20 or of the internal combustion engine, and the natural opening time NP, are recorded by being stored in an operating-point-dependent characteristic map. In this way, the reference values I_REF of the current and the natural opening time NP can be recorded, during the course of the first operating mode, for different operating conditions of the valve 20 and/or of the internal combustion engine.

In a second operating mode, also referred to as working mode, the current with the predefined value is applied to the actuator 42 at the time that lies in the predefined interval before the natural opening time NP. In particular, the time is dependent on the camshaft signal NS, and is dependent in particular on the time of top dead center TP. The predefined value corresponds to the reference value I_REF determined in the first operating mode. The measurement values I_AV of the current increase linearly (FIG. 4) proceeding from the starting value at the time of top dead center TP. If the valve 20 is arranged in the pump 10, then the applied current assumes the final value of the current when the pump piston 14 is close to bottom dead center.

The final value of the current is representative of the pin 34 being in a position in which it does not permit the closure of the valve 20. In other words, this means that the spring force F_1 is only slightly greater than the actuator force F_2. The pin 34 can come into contact with the sealing element 36 softly, and thus fix the position of the sealing element 36 with respect to the sealing seat 38, whereby the valve 20 can be held open in an effective manner. As a result of the slow movement of the pin 34, the noise generated by the valve 20 can be kept very low, and reliable and sufficiently fast opening of the valve 20 is nevertheless possible. As a result of the slow movement of the pin 34, it is furthermore possible for the wear of the valve 20 to be kept low.

What is claimed is:

1. A method for controlling a valve having a spring with a spring force, an actuator with an actuator force that counteracts the spring force, a pin actuated by the actuator, a sealing element that configured to be coupled to the pin, and a sealing seat, wherein the valve is closed when the sealing element bears against the sealing seat, the method comprising:
   determining an expected natural opening time at which the sealing element lifts from the sealing seat based on a pressure difference upstream and downstream of the valve, and
   applying an electrical current with a predefined value to the actuator at a time, within a predefined interval before the natural opening time, at which the sealing element bears against the sealing seat, such that the pin makes contact with the sealing element and the actuator force corresponds to the spring force reduced by a predefined value.

2. The method of claim 1, comprising:
   in a first operating mode:
      applying the current to the actuator with a predefined non-constant profile proceeding from a starting value of the current, at which the pin is in a position in which it permits the closure of the valve,
      determining measurement values of the current temporally in succession, and
      setting a reference value of the current to the present measurement value of the current when the profile of the measurement values of the current deviates by a predefined magnitude from the profile of the current applied to the actuator, wherein the reference value of the current is representative of the actuator force corresponding to the spring force reduced by the predefined value, and
   in a second operating mode, applying the reference value of the current to the actuator at the time within the interval before the natural opening time.

3. The method of claim 2, wherein the spring is configured for opening the valve, and
   wherein in the first operating mode, the applied current decreases linearly proceeding from the starting value of the current, and at the starting value of the current, the actuator force is greater than the spring force.

4. The method of claim 2, wherein the applied current is set as a function of a pulse width modulation.

5. The method of claim 2, wherein the measurement values of the current are determined as a function of a voltage across a shunt resistor.

6. The method of claim 2, wherein the reference value of the current is determined as a function of a temperature of a fluid in the valve or in a predefined region of the valve.

7. The method of claim 2, wherein the valve is arranged in an injection system of an internal combustion engine, and the reference value of the current is determined as a function of characteristic values of the internal combustion engine.

8. The method of claim 2, wherein the reference value of the current is stored in an operating-point-dependent characteristic map.

9. The method of claim 1, wherein in the second operating mode, measurement values of the current are determined as a function of a voltage across a shunt resistor.

10. The method of claim 1, wherein the natural opening time is determined as a function of at least one of (a) a temperature of a fluid in the valve or in a predefined region of the valve and (b) the pressure within the valve.

11. The method of claim 1, wherein the valve is arranged in an injection system of an internal combustion engine, and the natural opening time is determined as a function of characteristic values of the internal combustion engine.

12. The method of claim 1, wherein the natural opening time is stored in an operating-point-dependent characteristic map.

13. The method of claim 1, wherein in the second operating mode, after the natural opening time, an electrical current is applied to the actuator such that the pin moves into a position in which it does not permit the closure of the valve.

14. An electrical control device for controlling a valve having a spring with a spring force, an actuator with an actuator force that counteracts the spring force, a pin actuated by the actuator, a sealing element configured to be coupled to the pin, and a sealing seat, wherein the valve is closed when the sealing element bears against the sealing seat, wherein the electronic control device is configured to:
determine an expected natural opening time at which the sealing element lifts from the sealing seat based on a pressure difference upstream and downstream of the valve, and
apply an electrical current with a predefined value to the actuator at a time, within a predefined interval before the natural opening time, at which the sealing element bears against the sealing seat, such that the pin makes contact with the sealing element and the actuator force corresponds to the spring force reduced by a predefined value.

15. The electronic control device of claim 14, configured to:
in a first operating mode:
apply the current to the actuator with a predefined non-constant profile proceeding from a starting value of the current, at which the pin is in a position in which it permits the closure of the valve,
determine measurement values of the current temporally in succession, and
set a reference value of the current to the present measurement value of the current when the profile of the measurement values of the current deviates by a predefined magnitude from the profile of the current applied to the actuator, wherein the reference value of the current is representative of the actuator force corresponding to the spring force reduced by the predefined value, and
in a second operating mode, apply the reference value of the current to the actuator at the time within the interval before the natural opening time.

16. The electronic control device of claim 15, wherein the spring is configured for opening the valve, and
wherein in the first operating mode, the current applied by the electronic control device decreases linearly proceeding from the starting value of the current, and at the starting value of the current, the actuator force is greater than the spring force.

17. The electronic control device of claim 15, wherein the applied current is set as a function of a pulse width modulation.

18. The electronic control device of claim 15, wherein the measurement values of the current are determined as a function of a voltage across a shunt resistor.

19. The electronic control device of claim 15, wherein the reference value of the current is determined as a function of a temperature of a fluid in the valve or in a predefined region of the valve.

20. The electronic control device of claim 15, wherein the valve is arranged in an injection system of an internal combustion engine, and the reference value of the current is determined as a function of characteristic values of the internal combustion engine.

\* \* \* \* \*